(12) United States Patent
Ding et al.

(10) Patent No.: US 9,121,930 B2
(45) Date of Patent: Sep. 1, 2015

(54) TWO-CHANNEL MONOPULSE RADAR FOR THREE-DIMENSIONAL DETECTION

(75) Inventors: Xueru Ding, Chelmsford, MA (US); Jeff Schaefer, Chelmsford, MA (US); Matthew Marple, Pepperell, MA (US)

(73) Assignee: Autoliv ASP, Inc., Ogden, UT (US)

( * ) Notice: Subject to any disclaimer, the term of this patent is extended or adjusted under 35 U.S.C. 154(b) by 596 days.

(21) Appl. No.: 13/532,688

(22) Filed: Jun. 25, 2012

(65) Prior Publication Data
US 2015/0061921 A1   Mar. 5, 2015

(51) Int. Cl.
*G01S 13/44* (2006.01)
*G01S 13/93* (2006.01)
(Continued)

(52) U.S. Cl.
CPC ............... *G01S 13/003* (2013.01); *G01S 7/28* (2013.01); *G01S 13/4445* (2013.01); *G01S 13/931* (2013.01); *H01Q 1/28* (2013.01); *H01Q 1/32* (2013.01); *H01Q 21/0081* (2013.01); *H01Q 21/065* (2013.01)

(58) Field of Classification Search
CPC ............. G01S 3/02; G01S 3/74; G01S 13/02; G01S 13/06; G01S 13/42; G01S 13/44; G01S 13/4409; G01S 13/4418; G01S 13/4427; G01S 13/4436; G01S 13/4445; G01S 13/4454; G01S 13/4463; G01S 13/4472; G01S 13/4481; G01S 13/449; G01S 7/02; G01S 7/28; G01S 13/003; G01S 13/88; G01S 13/93; G01S 13/931; H01Q 1/27; H01Q 1/28; H01Q 1/32; H01Q 21/0006; H01Q 21/0075; H01Q 21/0081; H01Q 21/06; H01Q 21/061; H01Q 21/065

USPC ............... 342/73, 74, 80, 118, 134, 139, 140, 342/147–154, 175, 195, 82, 89–103, 146
See application file for complete search history.

(56) References Cited

U.S. PATENT DOCUMENTS 2,914,762 A * 11/1959 Gross et al. .................. 342/149
2,935,742 A *  5/1960 Allen ........................... 342/149
(Continued)

FOREIGN PATENT DOCUMENTS

EP            408263 A2      1/1991
WO         201096101 A1      8/2010

OTHER PUBLICATIONS

International Search Report, PCT/US2013/047613, Oct. 10, 2013, 14 pgs.

*Primary Examiner* — Bernarr Gregory
(74) *Attorney, Agent, or Firm* — Burns & Levinson, LLP; Steven M. Mills (57) ABSTRACT

An apparatus for determining the position of a target object using a two-channel monopulse radar. The radar may include two transmitting antennas and one common receiving antenna disposed in a coplanar arrangement. The transmitting antennas may be positioned on the focal plane of the radar along a focal plane axis that extends through, and that is perpendicular with, a boresight axis of the radar. The transmitting antennas may be spaced apart from one another in a first dimension a distance equal to about one half of one wavelength of the radar's center operating frequency. One of the transmitting antennas may be squinted at an angle of $\theta_1$ relative to the boresight axis and the other transmitting antenna may be squinted at an angle of $\theta_2$ relative to the boresight axis in a second dimension. The transmitting antennas are not squinted relative to one another in the first dimension.

9 Claims, 8 Drawing Sheets

(51) Int. Cl.
*H01Q 1/28* (2006.01)
*H01Q 1/32* (2006.01)
*H01Q 21/00* (2006.01)
*H01Q 21/06* (2006.01)
*G01S 7/28* (2006.01)
*G01S 13/00* (2006.01)

(56) References Cited

U.S. PATENT DOCUMENTS

| | | | |
|---|---|---|---|
| 3,026,513 A * | 3/1962 | Kurtz | 342/80 |
| 3,745,577 A * | 7/1973 | Goldmacher | 342/153 |
| 3,927,406 A * | 12/1975 | Bruder | 342/149 |
| 3,940,766 A * | 2/1976 | Cross et al. | 342/80 |
| 4,023,172 A * | 5/1977 | Schmidt | 342/149 |
| 4,160,974 A * | 7/1979 | Stavis | 342/154 |
| 4,296,415 A * | 10/1981 | Pelton et al. | 342/149 |
| 4,524,359 A * | 6/1985 | Champagne | 342/89 |
| 4,612,547 A | 9/1986 | Itoh | |
| 5,059,968 A | 10/1991 | Thompson et al. | |
| 6,195,035 B1 | 2/2001 | Wood | |
| 6,819,285 B1 * | 11/2004 | Stockman et al. | 342/139 |
| 7,466,261 B1 | 12/2008 | Hoctor et al. | |

* cited by examiner

TWO-CHANNEL MONOPULSE RADAR FOR THREE-DIMENSIONAL DETECTION

FIELD OF THE DISCLOSURE

The disclosure relates generally to the field of radar systems, and more particularly to monopulse radar systems for compact applications.

BACKGROUND OF THE DISCLOSURE

Over the past several decades, radar systems have been implemented in a broad range of applications for detecting target objects such as vehicles and airplanes. More recently, radar systems have been implemented in automobiles. Automotive radar systems have been developed for helping drivers to park their cars, to follow traffic at a safe distance, and to detect driving obstacles. For example, when an automotive radar system detects an obstacle or slowing traffic in front of the vehicle, the system may issue an audio and/or visual warning to the driver, such as in the form of an audible tone or a visible warning light. The system may also exercise active control over the vehicle, such as by applying the brakes, in order to avoid an accident.

A radar system may detect the range (e.g., distance) to a target object by determining the roundtrip delay period between the transmission of a radar signal and the receipt of the signal returning back to the radar antenna after it bounces off of the target object. This round-trip delay, divided in half and then multiplied by the speed of the signal radiation, gives the distance between the radar antenna and the target object, assuming the transmitting antenna and the receiving antenna of the system are the same antenna or are very close to each other.

In addition to detecting the range to a target object, a radar system may be used to detect the direction of a target object as expressed in terms of the target object's elevation angle, azimuth angle, and range relative to the radar antenna. Such direction detection is commonly achieved using a monopulse radar system having four channels for facilitating either amplitude-comparison monopulse (wherein the beams emitted by the four channels of the radar system are squinted) or phase-comparison monopulse (wherein the beams emitted by the four channels of the radar system are not squinted), or three channels if two channels are compared to a common base channel. By comparing the magnitudes for magnitude-comparison monoplulse or the phases for phase-comparison monopulse of the beams reflected off of a target object, the elevation angle and azimuth angle of the target object may be derived.

Figure 1A:
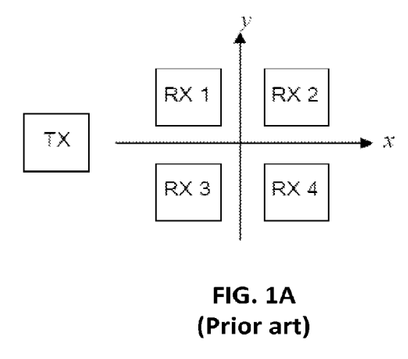
FIGS. 1A-1D are functional block diagrams illustrating various configurations of prior art monopulse radars.
Figure 1B:
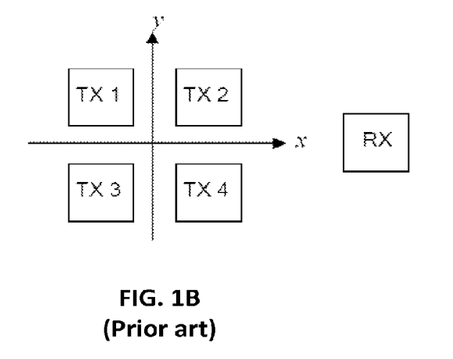
Figure 1C:
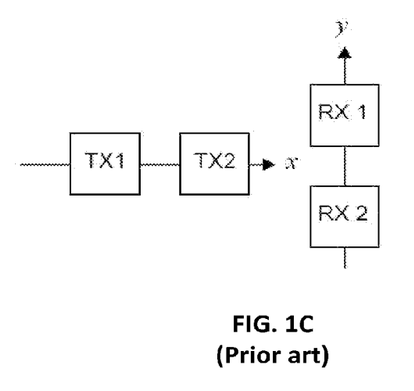
Figure 1D:
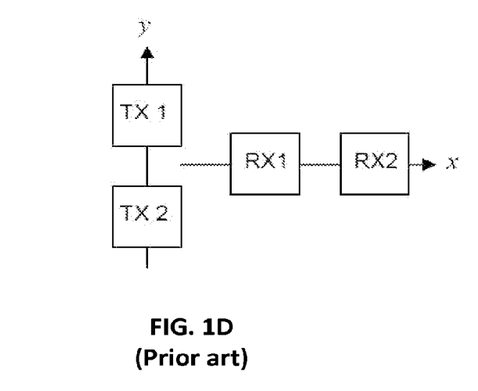

Conventional four-channel monopulse radar systems with three-dimensional detection are generally implemented using one of four different configurations. For example, referring to FIG. 1A, a four-channel monopulse radar system configuration is shown that includes a common transmitting channel TX and four receiving channels RX1-4 disposed in a 2×2 arrangement in the x and y directions. Referring to FIG. 1B, a system configuration is shown that includes one common receiving channel RX and four transmission channels TX1-4 disposed in a 2×2 arrangement in the x and y directions. Referring to FIG. 1C, a system configuration is shown that includes two transmitting channels TX1 and TX2 disposed in a side-by-side arrangement in the x direction and two receiving channels RX1 and RX2 disposed in a side-by-side arrangement in the y direction. Referring to FIG. 1D, a system configuration is shown that includes two transmitting channels TX1 and TX2 disposed in a stacked arrangement in the y direction and two receiving channels RX1 and RX2 disposed in a side-by-side arrangement in the x direction.

While four-channel monopulse radar systems are generally effective for determining the elevation and azimuth angles of target objects, the antenna and circuitry requirements of such systems can make them too large and too costly for practical implementation in automobile applications. Moreover, four-channel systems can present long detection times if the channels of a system are operated in series. It would therefore be desirable to provide a monopulse radar system for automobile applications that can be implemented in a compact volume and at a low cost.

SUMMARY

In accordance with the present disclosure, an apparatus and a method for determining the position of a target object using a two-channel monopulse radar for three-dimensional detection are disclosed.

An embodiment of a two-channel monopulse radar for three-dimensional detection in accordance with the present disclosure can include a receiving antenna as well as first and second transmitting antennas that are spaced apart from one another along a focal plane axis a distance equal to about one half of one wavelength of a center operating frequency of the radar. The first transmitting antenna can be squinted in a first direction perpendicular to the focal plane axis and the second transmitting antenna can be squinted in a second direction perpendicular to the focal plane axis.

BRIEF DESCRIPTION OF THE DRAWINGS

By way of example, specific embodiments of the disclosed device will now be described, with reference to the accompanying drawings, in which.

DETAILED DESCRIPTION

Figure 2:
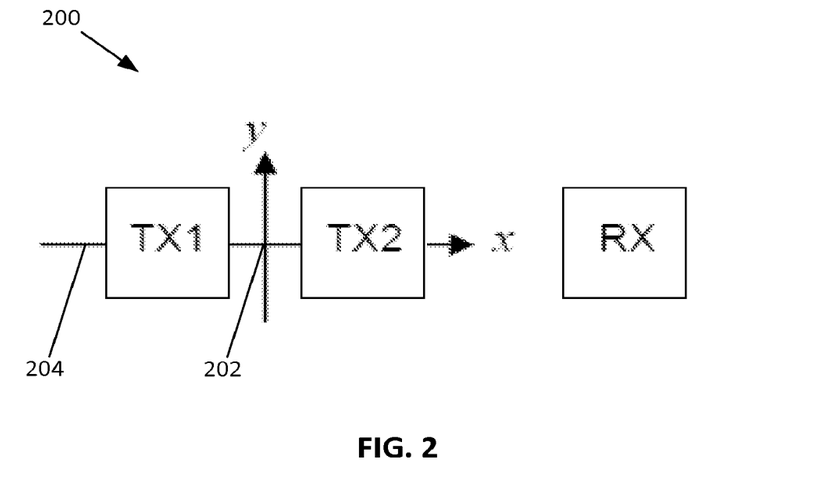
FIG. 2 is a functional block diagram illustrating a first embodiment of a two-channel monopulse radar for three-dimensional detection in accordance with the present disclosure.

Referring to FIG. 2, a functional block diagram representation of a two-channel monopulse radar for three-dimensional detection 200 is shown. The radar 200 may generally include two transmitting antennas TX1 and TX2 and one common receiving antenna RX disposed in a substantially coplanar arrangement, such as on the surface of a dielectric substrate (not shown). The transmitting antennas TX1 and TX2 may be positioned on the focal plane of the radar 200 horizontally equidistant from the boresight axis 202 of the radar 200 along a focal plane axis 204 (the x axis in FIG. 2) that is perpendicular to the boresight axis 202. The transmitting antennas TX1 and TX2 may be spaced apart from one another a distance equal to about one half of one wavelength of the radar's center operating frequency. One of the transmitting antennas TX1 or TX2 may be vertically "squinted" at an angle of θ relative to the boresight axis 202, and the other transmitting antenna TX1 or TX2 may be vertically "squinted" at an angle of −θ relative to the boresight axis 202. "Squinted" is defined herein as meaning "angled away." The transmitting antennas TX1 and TX2 are not horizontally squinted relative to one another.

Figure 3:
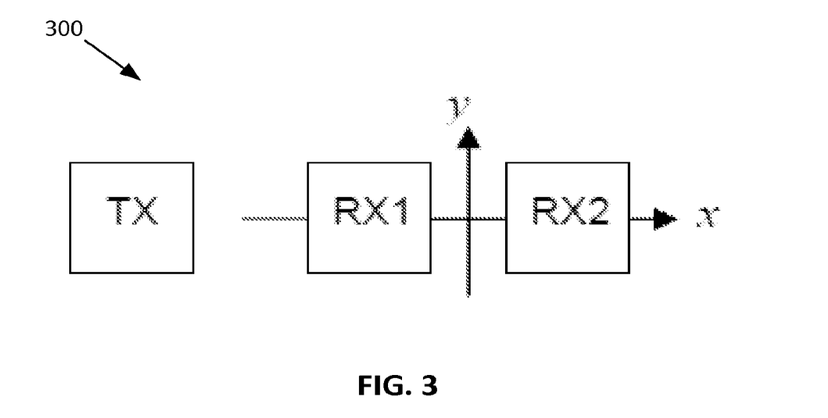
FIG. 3 is a functional block diagram illustrating a second embodiment of a two-channel monopulse radar for three-dimensional detection in accordance with the present disclosure.

Referring to FIG. 3, it will be appreciated by those of ordinary skill in the art that an alternative radar 300 may be implemented in accordance with the present disclosure wherein the radar 300 is provided with a single transmitting antenna TX and two receiving antennas RX1 and RX2 that are spaced apart and squinted in the manner of the antennas TX1 and TX2 as described above. While such an embodiment is contemplated and may be implemented without departing from the present disclosure, only the embodiment of the radar 200 shown in FIG. 2 will be described in detail herein. It will be therefore be understood that the following description of the radar 200 is provided by way of example only and is not meant to be in any way limiting.

Figure 4A:
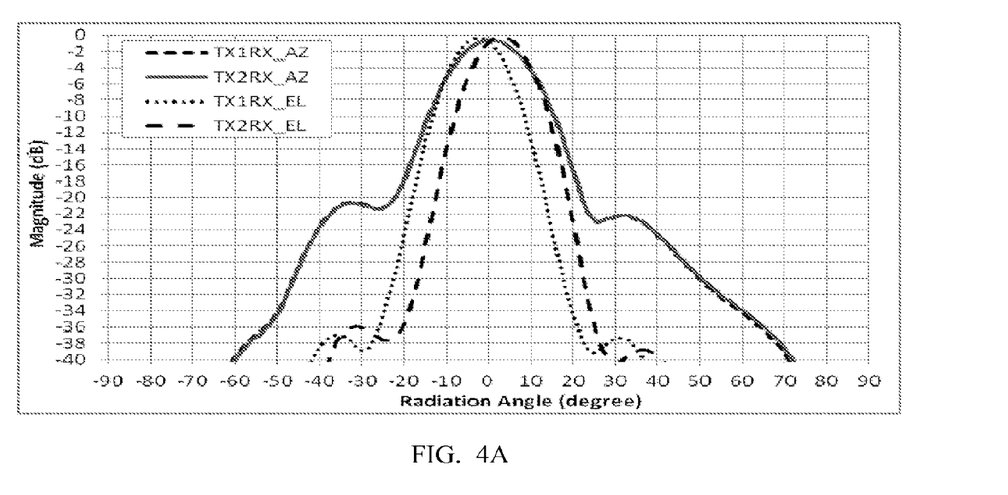
FIG. 4A is a graph illustrating measured antenna signal patterns for a two-channel monopulse radar in accordance with the present disclosure.
Figure 4B:
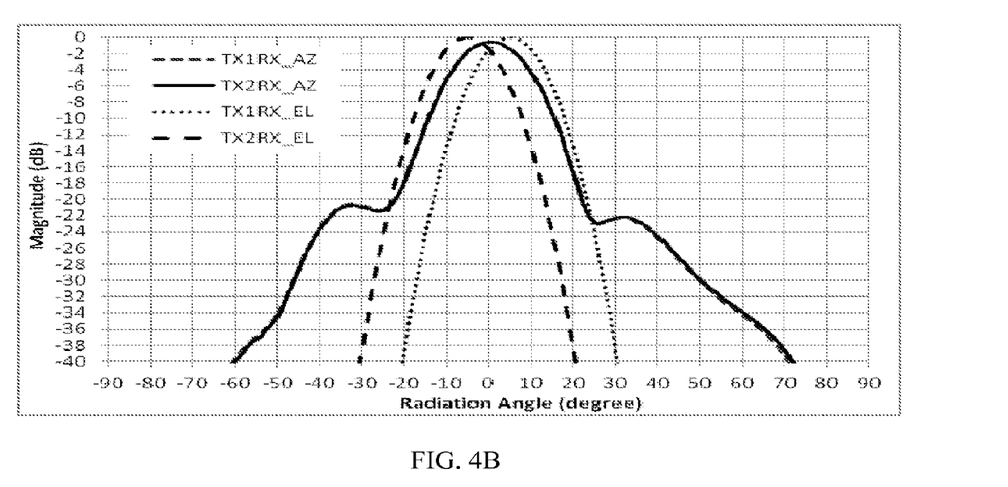
FIG. 4B is a graph illustrating ideal antenna signal patterns for a two-channel monopulse radar for three-dimensional detection in accordance with the present disclosure.

Referring to FIG. 4A, the measured two-way azimuth and elevation two-channel antenna patterns for the radar 200 of the present disclosure are shown. Corresponding ideal output patterns (e.g., free of errors or distortion) are shown in FIG. 4B. As can be seen in both FIGS. 4A and 4B, the radiation angles of the azimuth patterns for the transmitting antennas TX1 and TX2 are substantially identical. This is because the transmitting antennas TX1 and TX2 are not horizontally squinted relative to one another. By contrast, the radiation angles of the elevation patterns for the transmitting antennas TX1 and TX2 differ by approximately six degrees. This is because the transmitting antennas TX1 and TX2 are vertically squinted in opposing directions at an angle of θ relative to the boresight axis, wherein θ is approximately equal to 3 degrees. The transmitting antennas TX1 and TX2 are therefore vertically squinted relative to one another an angle of 2θ, or approximately 6 degrees.

Figure 5A:
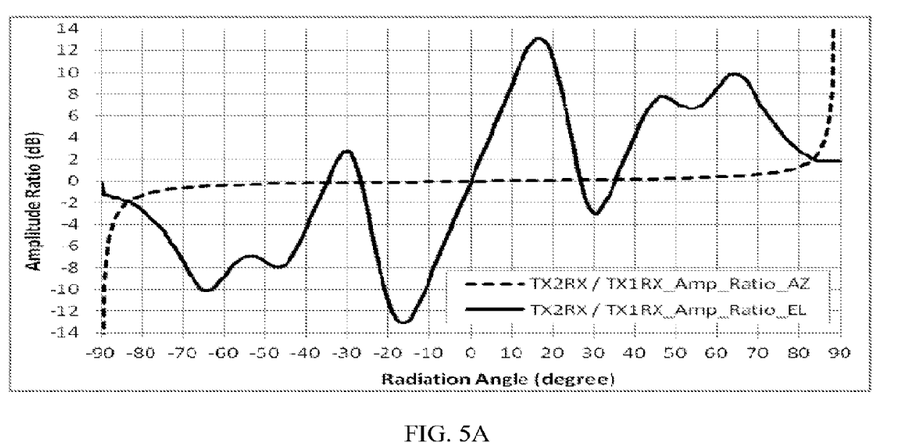
FIG. 5A is a graph illustrating a measured amplitude ratio pattern for a two-channel monopulse radar for three-dimensional detection in accordance with the present disclosure.
Figure 5B:
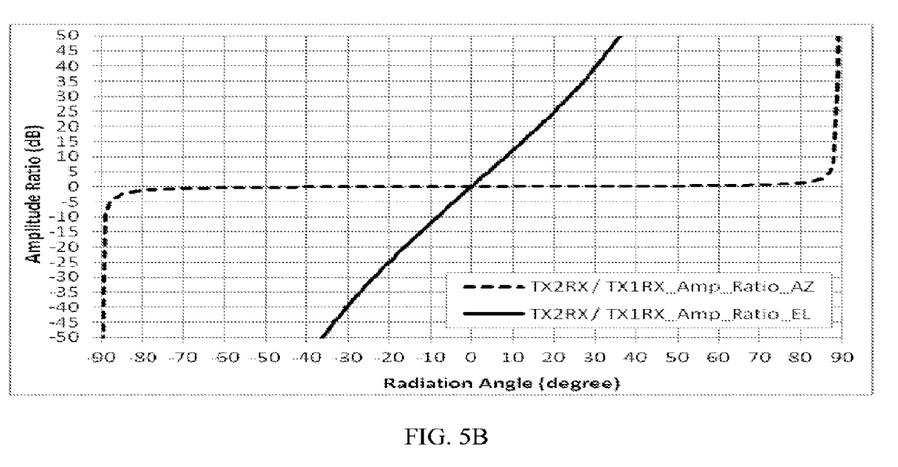
FIG. 5B is a graph illustrating an ideal amplitude ratio pattern for a two-channel monopulse radar for three-dimensional detection in accordance with the present disclosure.

By employing amplitude-comparison monopulse techniques, the above-described squinted configuration of the transmitting antennas TX1 and TX2 yields elevation and azimuth amplitude ratio patterns as shown in FIG. 5A (for measured patterns) and FIG. 5B (for ideal patterns). As can be seen, the substantially identical azimuth radiation patterns for the transmitting antennas TX1 and TX2 result in an azimuth amplitude ratio that is substantially equal to 0 dB across a wide radiation angle range of about −90 degrees to about +90 degrees in both the measured and ideal amplitude ratio patterns. However, as a result of the opposite vertical squinting of the transmitting antennas TX1 and TX2, the elevation amplitude ratio follows a substantially linear slope from about −15 degrees to about +15 degrees radiation angle (i.e. elevation angle) in the measured pattern and from about −90 degrees to about +90 degrees (only partially shown in FIG. 5B) in the ideal pattern. The nonlinearity of the elevation amplitude ratio slope below about −15 degrees and above about +15 degrees in the measured pattern can be attributed to low signal levels and resulting low detectability of the radar 200. Since objects that are targeted by automotive radar systems are generally located within a −15 degree to +15 degree vertical envelope relative to the radar system's boresight axis, the nonlinearity of the pattern outside of this range can be ignored in most applications.

The elevation amplitude ratio pattern produced by the vertically squinted transmitting antennas TX1 and TX2 thus facilitates direct derivation of a target object's elevation angle therefrom. For example, referring to FIG. 5A, an elevation amplitude ratio of 8 dB indicates a target object elevation angle of about 9 degrees, and an elevation amplitude ratio of about −10 dB indicates a target object elevation angle of about −10 degrees. Derivation of a target object's elevation angle from the amplitude ratio pattern may be performed by processing components that are integral with the radar 200 as further described below.

Figure 6:
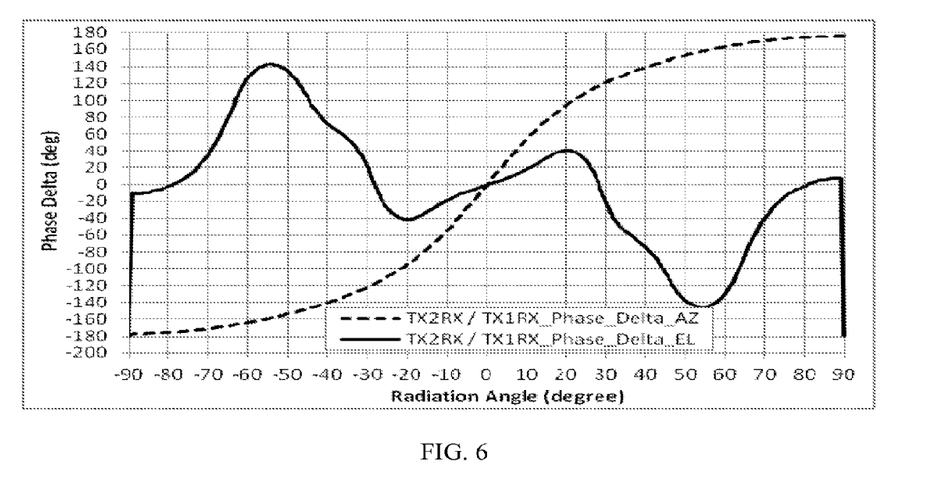
FIG. 6 is a graph illustrating measured phase difference patterns for a two-channel monopulse radar for three-dimensional detection in accordance with the present disclosure.

By employing phase-comparison monopulse techniques, the above-described configuration of the transmitting antennas TX1 and TX2, wherein the transmitting antennas TX1 and TX2 are not horizontally squinted relative to one another, yields elevation and azimuth phase delta patterns as shown in FIG. 6. As can be seen, the azimuth phase delta pattern is a monotonic curve extending over the entire radiation angle range of −90 degrees to +90 degrees. A target object's azimuth angle can thus be derived directly from the phase difference between the signals emitted from the transmitting antennas TX1 and TX2 and reflected off of the target. For example, a phase delta of 120 degrees indicates a target object azimuth angle of about 30 degrees, and a phase delta of −60 degrees indicates a target object azimuth angle of about −10 degrees. Any phase deviation that may be caused by the target object's elevation angle can be calibrated out as the elevation angle is a known quantity from previous determination (as described above). Derivation of a target object's azimuth angle from the phase delta pattern and calibration thereof may be performed by processing components that are integral with the radar 200 as further described below.

Figure 7:
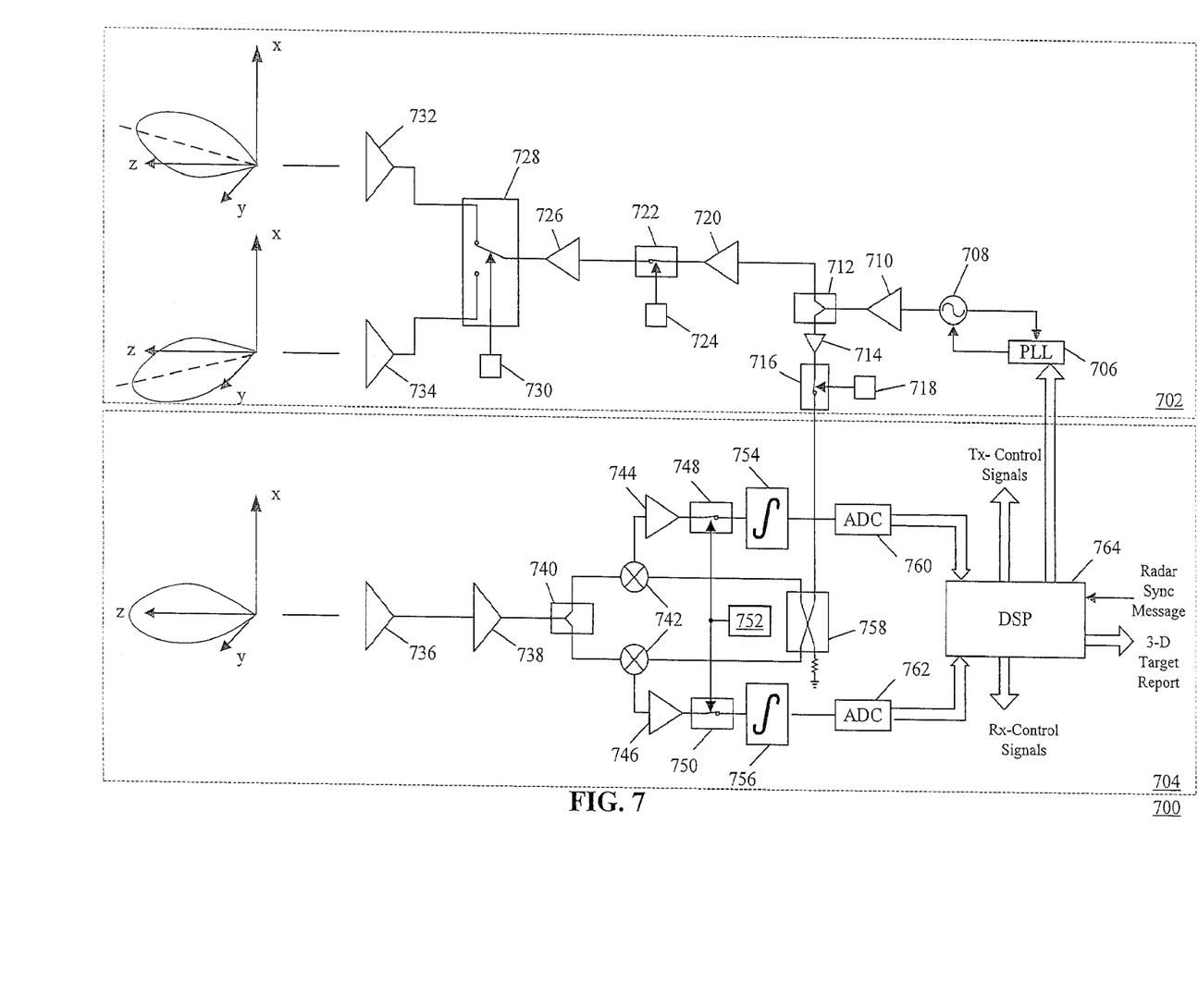
FIG. 7 is a more detailed circuit block diagram illustrating a two-channel monopulse radar for three-dimensional detection in accordance with the present disclosure.

Referring to FIG. 7, a circuit diagram of an exemplary two-channel monopulse radar 700 in accordance with the present disclosure is shown. The radar 700 may include a transmitter side 702 and a receiver side 704. The transmitter side 702 may include a phase lock loop (PLL) synthesizer 706, a signal generating unit 708, a radio-frequency (RF) buffer amplifier 710, a RF power splitter 712, a local oscillator driver amplifier 714, a local oscillator switch 716 and control 718, a RF driver amplifier 720, a transmitter switch 722 and control 724, a transmitter power amplifier 726, a transmitter antenna switch 728 and control 730, and transmitting antennas 732 and 734. The transmitting antennas 732 and 734 are spaced apart a distance equal to about one half of one wavelength of the radar's center operating frequency in a first dimension. This configuration may provide many advantages, such as facilitating resolution of a first angle (e.g. azimuth or elevation angle) of target objects in the manner described above. The transmitting antenna 732 may be squinted upwardly relative to the boresight axis of the radar 700 (e.g., the z axis in FIG. 7) in a second dimension, perpendicular to the first dimension, at an angle $\theta_1$. The transmitting antenna 734 may be squinted downwardly relative to the boresight axis of the radar 700 in the second dimension at an angle $\theta_2$ to facilitate resolution of a second angle (e.g. elevation or azimuth angle) of target objects in the manner described above.

The receiver side 704 of the radar 700 may include a receiving antenna 736, a low noise amplifier 738, a receiver power splitter 740, an I/Q mixer 742, intermediate frequency variable gain amplifiers 744 and 746, sample and hold switches 748 and 750 and control 752, I channel and Q channel integrators 754 and 756, a local oscillator power splitter 758, analog to digital convertors 760 and 762, and a digital signal processor 764. In addition to driving the PLL synthesizer 706 and the various switch controls of the circuit to operate the radar 700 in a manner substantially similar to a conventional monopulse radar, the digital signal processor 764 may perform various kinds of signal processes on the signals received by the receiving antenna 736 (and mixed, amplified, and converted thereafter) to generate a 3-dimensional target object report that may include the distance, speed, elevation angle, and azimuth angle of a detected target object.

As previously stated, an alternative embodiment of the radar 700 is contemplated that includes a single transmitting antenna and two receiving antennas, wherein the receiving antennas are squinted and spaced apart in the manner of the transmitting antennas 732 and 734. Of course, such an embodiment will necessitate certain other modifications to the configuration and number of components of the radar 700 shown FIG. 7 as will be appreciated by those of ordinary skill in the art.

Figure 8A:
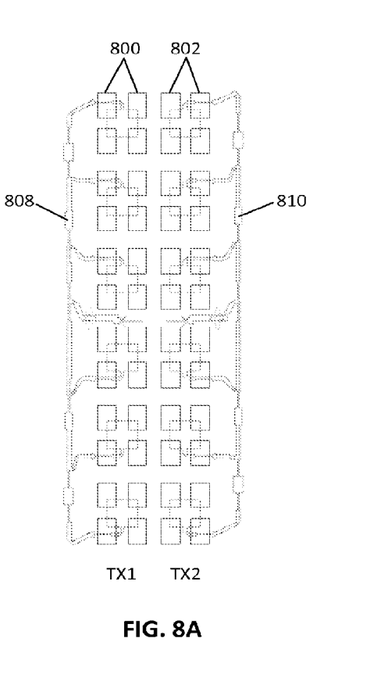
FIG. 8A is a circuit layout illustrating a transmitting antenna configuration for a two-channel monopulse radar for three-dimensional detection in accordance with the present disclosure.
Figure 8B:
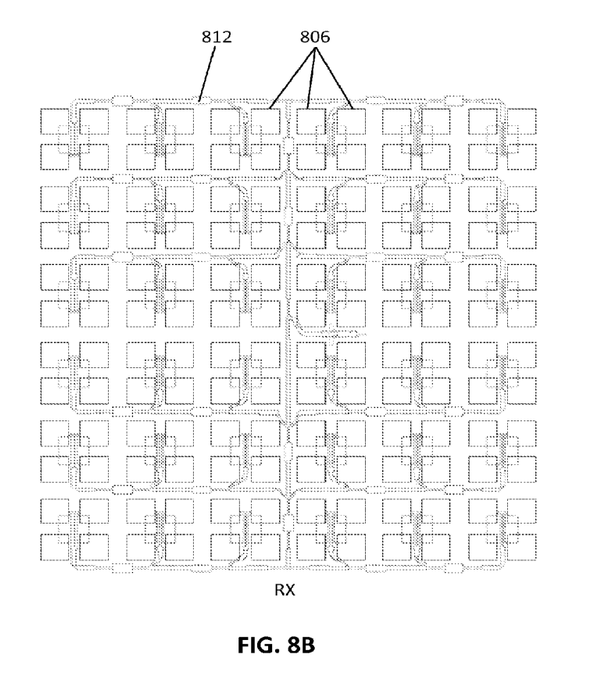
FIG. 8B is a circuit layout illustrating a receiving antenna configuration for a two-channel monopulse radar for three-dimensional detection in accordance with the present disclosure.

Referring to FIGS. 8A and 8B, exemplary antenna structures are shown for transmitting antennas TX1 and TX2 and receiving antenna RX in accordance with the present disclosure. Generally, the antennas TX1, TX2, and RX may each be formed of a plurality of patch antenna components 800, 802, and 806 (on the outer side of a substrate) interconnected with respective feed systems 808, 810, and 812 as is known. A plurality of grounding vias (not shown) may also be provided as is known. Although the transmitting antennas TX1 and TX2 are shown as one-by-six sub-group patch arrays and the receiving antenna is shown as a six-by-six sub-group patch array (each sub-group with a two-by-two patch array), the configuration and number of patch elements implemented in each antenna TX1, TX2, and RX may be modified as desired or needed.

Figure 9:
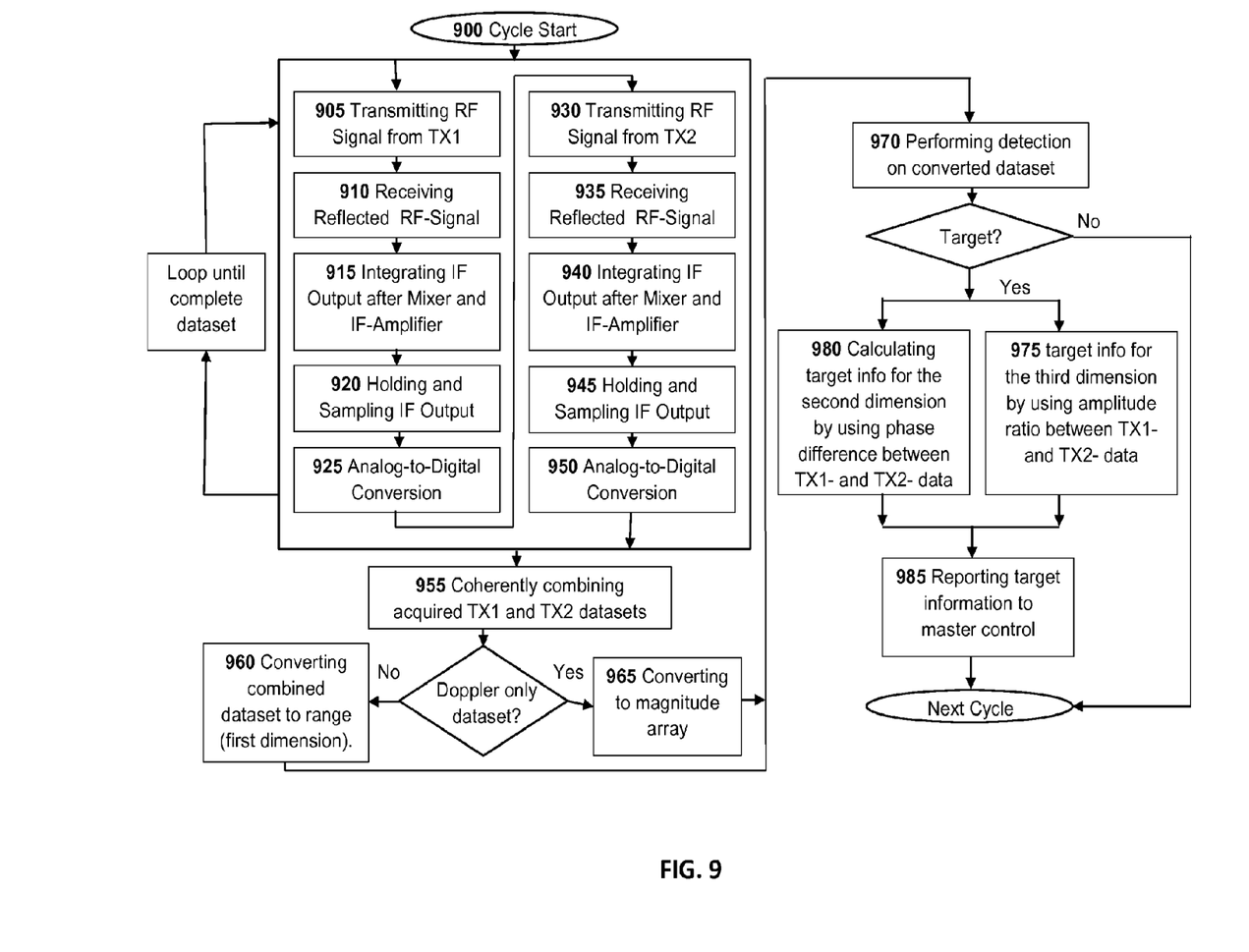
FIG. 9 is a flow diagram illustrating a method for acquiring position data for a target object using a two-channel monopulse radar for three-dimensional detection in accordance with the present disclosure.

FIG. 9 is a flow diagram of an exemplary process for determining target object data such as range, elevation angle, and azimuth angle using a two-channel monopulse radar similar to radar 700 shown in FIG. 7. The depicted process may be executed wholly or in part by a digital signal processor, such as digital signal processor 764 as described with reference to FIG. 7, for example. After the process cycle is initiated at step 900, a first RF signal is transmitted from transmitting antenna TX1 at step 905. The reflected first RF signal is then received by the receiving antenna RX at step 910, and is mixed, sampled, integrated, and converted at steps 915-925. A second RF signal is then transmitted from transmitting antenna TX2 at step 930. The reflected second RF signal is then received by the receiving antenna RX at step 935, and is mixed, sampled, integrated, and converted at steps 940-950. This process of transmitting signals from transmitting antennas TX1 and TX2 and receiving, mixing, sampling, integrating, and converting reflected signals is repeated until the digital signal processor has acquired complete data sets in frequency or time domain for both of the transmitting antennas TX1 and TX2.

Once complete data sets have been compiled for both of the transmitting antennas TX1 and TX2, the data sets are coherently combined by the digital signal processor at step 955. If it is determined that the combined data set is not a Doppler only data set, the digital signal processor converts the combined data set in a conventional manner to acquire a range of the target object at step 960. Alternatively, if the data set is a Doppler only data set, the digital signal processor converts the combined data set into a magnitude array at step 965. At step 970, the digital signal processor performs a detection operation on the converted data set to determine whether a target has been detected. If a target object has not been detected, the digital signal processor initiates a new process cycle at step 900. Alternatively, if a target object has been detected, the digital signal processor calculates a first angle of the target object using the phase difference between the received transmitting antenna TX1 signal and the received transmitting antenna TX2 signal at step 975, and calculates a second angle of the target object using the amplitude ratio of the received transmitting antenna TX1 signal and the received transmitting antenna TX2 signal at step 980. In some embodiments of the present disclosure, the first angle and the second angle may be referred to the azimuth angle and the elevation angle, respectively. In other embodiments of the present disclosure, the first angle and the second angle may be referred to as the elevation angle and the azimuth angle, respectively. The target object data, including range, elevation angle, and azimuth angle, are then provided as output by the digital signal processor at step 985. A new process cycle may then be initiated.

Thus, various embodiments of the present disclosure provide a two-channel monopulse radar for three-dimensional detection that employs a pair of transmitting antennas TX1 and TX2 (or receiving antennas RX1 and RX2) that are spaced apart in a first dimension and squinted in a second dimension and a single receiving antenna RX (or transmitting antenna TX). In some embodiments of the present disclosure, the first dimension and the second dimension may be referred to as horizontal and vertical, respectively. In other embodiments of the present disclosure, the first dimension and the second dimension may be referred to as vertical and horizontal, respectively. Such configuration facilitates the acquisition of a target object's first angle via phase-comparison monopulse and simultaneously facilitates the acquisition of the target object's second angle via amplitude-comparison monopulse. In some embodiments of the present disclosure, the first angle and the second angle may be referred to as the azimuth angle and the elevation angle, respectively. In other embodiments of the present disclosure, the first angle and the second angle may be referred to as the elevation angle and the azimuth angle respectively. By acquiring all of a target object's position data (e.g. range, speed, elevation angle, and azimuth angle) simultaneously, there is no extra detection time devoted to acquiring any single data. The radar of the present disclosure therefore exhibits greater overall system sensitivity and may be operated with fewer components (thereby reducing size) and at a lower cost relative to conventional monopulse radar systems.

The components of the various embodiments of the radar of the present disclosure may be constructed of different materials such as, for example, semiconductor material. Further, and for example, the pulses provided by the radar may be generated in different frequency bands, such as different microwave, millimeter wave, and other radio frequency bands. Additionally, the transmitting antenna(s) and receiving antenna(s) and components thereof may be formed of standard antenna arrays as are known. The transmitter side and receiver side of the exemplary radar 700 shown in FIG. 7 may include any type of RF switching devices, such as field effect transistor (FET) switches, Schottky diodes, PIN diodes, etc. that are switched on and off using a pulse source (e.g., oscillator) as is known.

The various embodiments or components, for example, the radar and components or controllers therein, may be implemented as part of one or more computer systems, which may be separate from or integrated with the radar. The computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention, for example, for generating two antenna patterns having different widths. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A method for acquiring position data for a target object using a two-channel monopulse radar, the method comprising:
   transmitting a first signal from a first transmitting antenna squinted in a first direction at a first angle relative to a boresight axis of the radar, the boresight axis of the radar being perpendicular to a focal plane axis of the radar;
   transmitting a second signal from a second transmitting antenna squinted in a second direction at a second angle relative to the boresight axis of the radar;
   receiving the first and second signals after they have been reflected;
   mixing, sampling and holding, integrating, and analog-to-digital converting the received reflected first and second signals;
   repeating the steps of transmitting, receiving, mixing, sampling and holding, integrating and analog-to-digital converting until datasets are generated for the first and second transmitting antennas;
   using the datasets, calculating one of an elevation angle and an azimuth angle from an amplitude ratio of the first and second received signals; and
   using the datasets, calculating the other of the elevation angle and the azimuth angle from a phase difference between the first and second received signals.

2. The method of claim 1, wherein the focal plane axis is horizontally oriented.

3. The method of claim 1, wherein the focal plane axis is vertically oriented.

4. The method of claim 1, further comprising
   spacing the first transmitting antenna and the second transmitting antenna apart from one another along the focal plane axis of the radar a distance equal to about one half of one wavelength of a center operating frequency of the radar.

5. The method of claim 1, wherein the first angle relative to the boresight axis of the radar is not equal to the second angle relative to the boresight axis of the radar.

6. The method of claim 1, further comprising coherently combining the datasets for the first and second transmitting antennas to generate a combined dataset.

7. The method of claim 6, further comprising:
   converting the combined dataset to acquire a range of a target object when the combined dataset is a Doppler-only dataset; and
   converting the combined data set to a magnitude array when the combined dataset is not a Doppler-only dataset.

8. The method of claim 7, further comprising:
   when a target object has been detected:
      calculating one of an elevation angle and an azimuth angle of the target object from an amplitude ratio of the first and second received signals; and calculating the other of the elevation angle and the azimuth angle of the target from a phase difference between the first and second received signals.

9. The method of claim 8, further comprising reporting position data of the target object to a master control.

\* \* \* \* \*